United States Patent [19]

Theising

[11] Patent Number: 4,996,923
[45] Date of Patent: Mar. 5, 1991

[54] MATRIX-SUPPORTED FLECHETTE LOAD AND METHOD AND APPARATUS FOR MANUFACTURING THE LOAD

[75] Inventor: John L. Theising, St. Louis, Mo.

[73] Assignee: Olin Corporation, Stamford, Conn.

[21] Appl. No.: 439,894

[22] Filed: Nov. 21, 1989

Related U.S. Application Data

[62] Division of Ser. No. 178,732, Apr. 7, 1988, Pat. No. 4,935,177.

[51] Int. Cl.⁵ .............................................. F24B 12/64
[52] U.S. Cl. .................................. 102/438; 102/455; 102/457; 102/496; 102/703
[58] Field of Search ............... 102/438, 703, 448, 455, 102/457, 496

[56] References Cited

U.S. PATENT DOCUMENTS

| | | | |
|---|---|---|---|
| 3,413,384 | 11/1968 | Olliff, Jr. ............................. | 264/3.1 |
| 3,599,568 | 8/1971 | Shellnutt et al. ..................... | 102/455 |
| 3,637,449 | 1/1972 | Raech, Jr. ............................ | 156/305 |
| 3,881,416 | 5/1975 | Dilworth, Jr. ....................... | 102/506 |
| 4,036,140 | 7/1977 | Korr et al. .......................... | 102/438 |
| 4,211,169 | 7/1980 | Brothers .............................. | 102/494 |
| 4,218,415 | 8/1980 | Biscaro ............................... | 264/46.4 |
| 4,448,900 | 5/1984 | Schwarz .............................. | 521/57 |
| 4,556,438 | 12/1985 | Hoffmeister et al. ................. | 156/79 |
| 4,638,737 | 1/1987 | McIngrale ........................... | 102/489 |
| 4,740,344 | 4/1988 | Wollbeck et al. .................... | 264/248 |
| 4,770,101 | 9/1988 | Robertson et al. ................... | 102/489 |

Primary Examiner—Charles T. Jordan
Assistant Examiner—Richard W. Wendtland
Attorney, Agent, or Firm—John R. Wahl

[57] ABSTRACT

In a method and apparatus for manufacturing a flechette load, a series of operative steps are carried out to produce a matrix-supported load of flechettes held in a desired array. First, a load of flechettes are mounted by a die end cap in a desired array in which at least the trailing end portions thereof are exposed and disposed in closely spaced side-by-side relation. Next, the die end cap is assembled to a die body such that at least the exposed trailing end portions of the flechettes are placed in the mold cavity of the assembled die. A mixture of expandable thermoplastic beads and, preferably, a bond weakening agent is also placed in the mold cavity with the mixture surrounding the exposed trailing end portions of the flechettes therein. Finally, the mixture is heated so as to produce in the mold cavity directly on and about the exposed trailing end portions of the flechettes a matrix in the form of a solid foam body of a thermoplastic foam material. The desired precise location and alignment of the flechettes relative to one another is thereby fixed by the solid matrix before placing the matrix-supported flechette load as a unit into a shell.

11 Claims, 1 Drawing Sheet

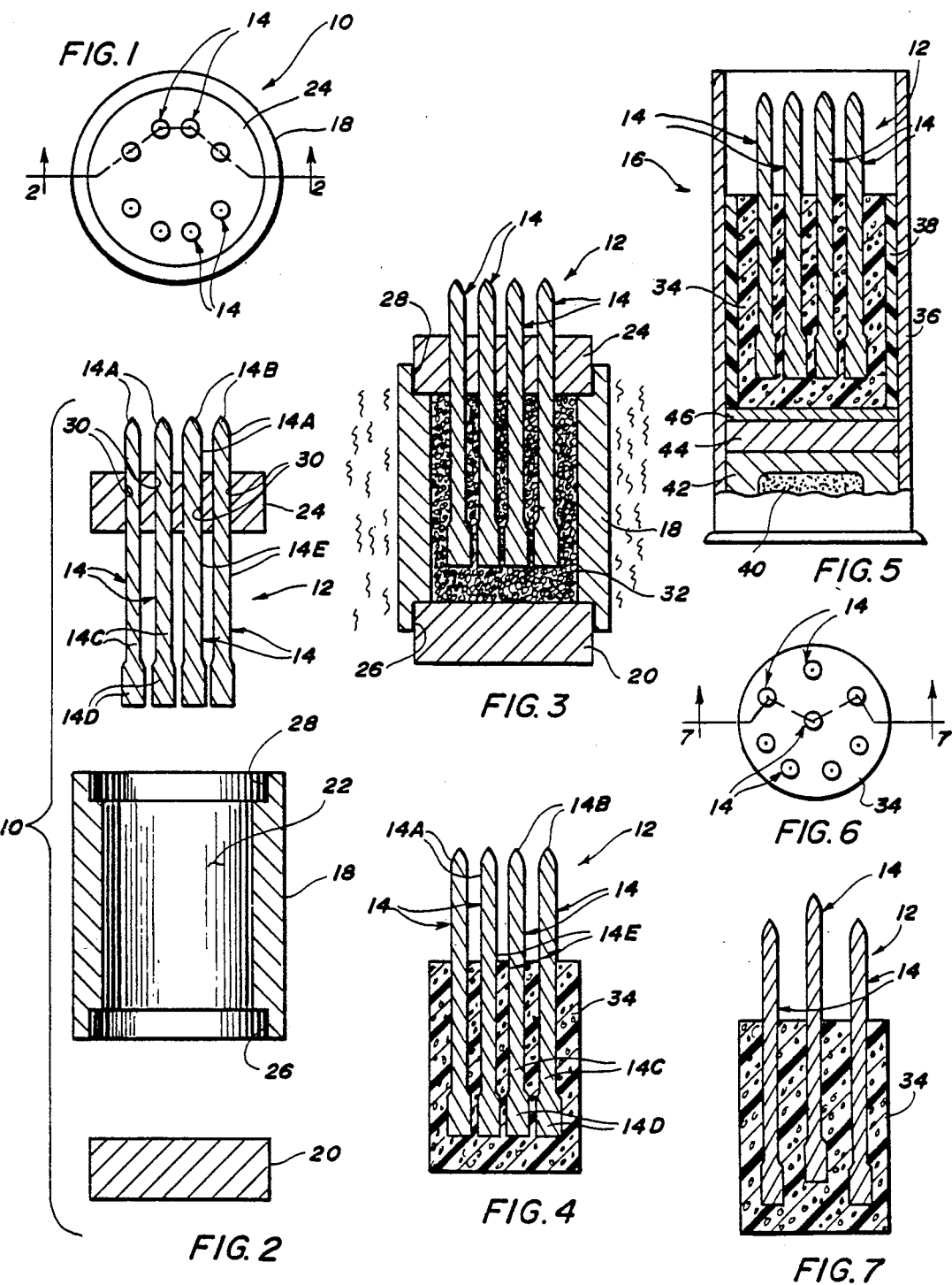

MATRIX-SUPPORTED FLECHETTE LOAD AND METHOD AND APPARATUS FOR MANUFACTURING THE LOAD

This application is a division of application Ser. No. 07/178,732, filed Apr. 7, 1988 now U.S. Pat. No. 4,935,177.

BACKGROUND OF THE INVENTION

1. Field of the Invention

The present invention generally relates to an ammunition round containing a load of elongated needle-like finned or unfinned projectiles commonly known as flechettes and, more particularly, is concerned with a matrix-supported flechette load and a method and apparatus for manufacturing the load.

2. Description of the Prior Art

It is well-known to provide an ammunition round, such as a shotshell, which contains a densely packed load of flechettes in place of ordinary round shot. A flechette typically has a long thin needle-like body with a pointed tip on its leading end and radially-projecting circumferentially-spaced fins on its trailing end like an arrow, or is heavy at the front and lighter at the back like a spear.

Due to their configurations, problems can arise if the flechettes are not properly packed and supported together in the shell casing. Flechette fins are thin and tend to bend upon launching if the flechettes are packed loosely together and inadequately supported relative to one another so as to allow contact between adjacent fins. Once bent the fins fail to properly guide the flechettes after they exit the muzzle of the gun barrel. Also, flechette misalignment and lack of adequate support to withstand accelerating forces can cause buckling and bending of the flechette bodies in the bore of the gun, resulting in undesirable yawing as they exit the muzzle.

U.S. Pat. No. 3,599,568 to Shellnutt et al, assigned to the same assignee as the present invention, discloses one approach to package and support a load of flechettes so as to avoid the above-described problems. In this patent, the projectiles or flechettes are placed in a cup and held in a predetermined alignment therein by a loose filler material, such as granulated polyethylene, dispersed in the spaces present between and about the flechettes within the cup. The loose filler material maintains alignment of the flechettes as they travel down the barrel and emerge from the muzzle of the barrel. However, one major drawback with this approach is the difficulty in accurately assembling the cup, flechettes and filler together and with the shotshell casing.

Consequently, a need still exists for an improved approach to packaging flechettes in a load which will overcome the above-described problems with prior flechette packing techniques.

SUMMARY OF THE INVENTION

The present invention provides a matrix-supported flechette load and a method and apparatus for manufacturing the load which all satisfy the aforementioned needs. In the present invention, prior to placement within a shell casing a group or load of flechettes are held in a desired array in a mold cavity and a thermoplastic matrix is molded directly thereto such that, at the most, only leading portions of the flechettes having the pointed tips extend from the matrix. Thus, the desired precise location and alignment of the flechettes relative to one another is fixed by the solid matrix before placing them as a unit into the shell.

The exterior configuration of the matrix is designed to allow direct loading of the matrix-supported flechette load into a shell casing. Thus, the flechettes will be properly aligned with one another therein automatically, with the act of placing the matrix-supported flechettes into the shell incapable of adversely affecting or altering their alignment in the array. With each flechette now precisely located and aligned relative to one another the possibility of initial yawing of the flechettes during and immediately following launch is minimized.

Preferably, the matrix is a block-like foam body of a suitable thermoplastic foam material, such as styrofoam. The foam body is produced by heating a mixture of suitable expandable thermoplastic beads, such as polystyrene beads, weakened by and additive such as zinc stearate, while contained in the mold cavity surrounding the intermediate main body and trailing portions of the flechettes.

Accordingly, the present invention is directed to a method and apparatus for manufacturing the flechette load which comprises the operative steps of: (a) mounting a load of flechettes in a desired array in which at least the trailing end portions thereof are exposed and disposed in closely spaced side-by-side relation; (b) placing in a mold cavity at least the exposed trailing end portions of the flechettes maintained in the desired array; (c) placing a mixture of expandable thermoplastic beads and a bonding deterrent in the mold cavity so that the mixture surrounds the exposed trailing end portions of the flechettes therein; and (d) heating the mixture so as to produce in the mold cavity directly on and about the exposed trailing end portions of the flechettes a matrix in the form of a solid foam body of a thermoplastic foam material such that the desired precise location and alignment of the flechettes relative to one another is fixed by the matrix before placing the matrix-supported flechette load as a unit into a shell. The exterior configuration of the matrix is designed to allow direct loading of the matrix-supported flechette load into a shell casing without adversely affecting the flechette alignment.

More particularly, a molding die component is employed for mounting the flechette load in the desired array. The molding die component supports at least the exposed trailing end portions of the flechettes in the desired array within the mold cavity once the die component is applied to close the cavity. Heating of the mixture to produce the matrix in the mold cavity is carried out transferring heat to the mixture through an assembled die which defines the mold cavity.

Further, the present invention is directed to the flechette load which comprises: (a) a load of flechettes; and (b) a matrix molded directly to the flechettes such that the flechettes are supported in desired alignments relative to one another with, at the most, only pointed-tipped leading portions of the flechettes extending from the matrix, whereby the matrix-supported load of flechette can be placed as a unit into a shell casing. The matrix has an exterior configuration designed to allow direct loading of the matrix-supported flechette load into the shell casing without adversely affecting the alignments of the flechettes.

More particularly, the matrix is a solid foam body composed of a thermoplastic foam material, such as styrofoam. The foam material is a heated mixture of expandable thermoplastic beads, such as polystyrene beads, and a bond weakening agent such as zinc stearate.

These and other advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIG. 1 is a top plan view of an apparatus for manufacturing a matrix-supported flechette load in accordance with the principles of the present invention.

FIG. 2 is a longitudinal sectional view taken along line 2—2 of FIG. 1, illustrating the apparatus in disassembled form.

FIG. 3 is another longitudinal sectional view similar to that of FIG. 2, but now illustrating the apparatus in assembled form.

FIG. 4 is a longitudinal sectional view of one configuration of a matrix-supported flechette load which can be made by the apparatus of FIG. 3.

FIG. 5 is a longitudinal sectional view of a shotshell with the matrix-supported flechette load of FIG. 5 disposed therein.

FIG. 6 is a top plan view of another matrix-supported flechette load having flechettes in a configuration different from that of the flechettes in the load of FIG. 4.

FIG. 7 is a longitudinal sectional view of the matrix-supported flechette load of FIG. 6.

DETAILED DESCRIPTION OF THE INVENTION

Referring now to the drawings, and particularly to FIGS. 1 to 3, there is shown a cylindrical molding apparatus 10 for manufacturing a matrix-supported load 12 of flechettes 14, as seen in FIG. 4, for loading into a shotshell 16, as seen in FIG. 5. The molding apparatus 10 basically includes die components in the form of a hollow cylindrical die body 18 and a solid cylindrical die end cap 20 defining a cylindrical mold cavity 22, and a perforated cylindrical end cap 24.

More particularly, the hollow die body 18 of the molding apparatus 10 is open at both ends and has annular recesses 26, 28 defined in surrounding relation to its ends. As shown in FIG. 3, the diameter and depth of each of the recesses 26, 28 are sized relative to the respective end caps 20, 24 to receive about one-half of their axial extents in seated relation therein so as to close the opposite ends of the die body 18. Suitable means (not shown) are used to clamp the end caps 20, 24 in the seated relation shown in FIG. 3. Thus, the die end caps 20, 24 are adapted to mate with and close the opposite ends of the hollow die body 18.

The perforated end cap 24 of the molding apparatus 10 has a plurality of axially-extending passages or holes 30 defined in parallel relation therethrough. The holes 30 are defined in a pattern which matches that of the desired array for the flechettes 14. In the embodiment of FIGS. 1–5, such pattern is a circular one, as best seen in FIG. 1. The diametric size of the holes 30 adapt them to receive the flectettes in a tight fitting relation such that the end cap 24 frictionally engages and holds the flechettes 14 at the leading end portions 14A thereof adjacent their pointed tips 14B so that the exposed trailing end portions 14C having the fins 14D thereon and the intermediate body portions 14E thereof will be disposed in the mold cavity 22. Thus, when the flechette-supporting end cap 24 is mated with the top end of the die body 18 by being seated in the top recess 28 therein, the load 12 of flechettes 14 are disposed in the desired array in the mold cavity 22 in which at least the trailing end portions 14C thereof are exposed and disposed in closely spaced side-by-side relation. It is seen in FIG. 3 that sufficient space remains in the mold cavity 22 to hold a mixture 32 of expandable thermoplastic beads and a bonding deterrent therein surrounding the exposed trailing end and intermediate body portions 14C, 14E of the flechettes 14.

As schematically represented in FIG. 3, a source (not shown) of heat is provided for heating the molding apparatus 10 and thereby the mixture 32 so that a matrix 34 in the form of a solid foam body of thermoplastic form material can be produced in the mold cavity 22. The solid foam matrix 34 is produced in the mold cavity 22 directly on and extending in the space about the exposed trailing end and intermediate body portions 14C, 14E of the flechettes 14.

The solid foam matrix 34, illustrated by itself in FIG. 4, thereby fixedly supports the flechettes 14 in the desired precise locations and alignments relative to one another before the matrix-supported flechette load 12 is subsequently placed as a unit into a casing 36 of the shotshell 16, as seen in FIG. 5. The matrix 34 is molded to have an exterior configuration which more or less allows a direct loading of the matrix-supported flechette load 12 into the shotshell casing 36 without any real possibility of the loading operation adversely affecting flechette alignment. The advantage of the matrix-supported flechette load 12 in terms of simplifying the task of loading the flechettes in the desired array in the casing 36 are self-evident.

Therefore, in the method for manufacturing the flechette load 12, the flechettes 14 are first mounted in the desired array to the perforated end cap 24 so that at least the trailing end portions 14C thereof, and preferably also the intermediate body portions 14E thereof, are exposed and disposed in closely spaced side-by-side relation. The bottom end cap 20 is mated to the bottom end of the die body 18 to close the same, and then the mixture 32 of expandable thermoplastic beads, such as polystyrene bead, and a bond weakening agent (bonding deterrent) such as zinc stearate, is placed in the mold cavity 22. The top end cap 24 with the flechette load 12 supported thereon is applied to the top end of the die body 18 which places the portions 14C, 14E of the flechettes in the mold cavity 22 while maintained in the desired array.

Next, heat is applied to the molding apparatus 10 and thereby to the mixture 32 to produce the thermoplastic foam matrix 34, such as a styrofoam matrix. One approach to applying heat is by submersing the apparatus 10 in a steam or boiling water bath. In such approach, the heating of the mixture 32 to produce the matrix 34 in the mold cavity 22 is carried out by transferring heat to the mixture 34 through the assembled die components which define the mold cavity 22.

As seen in FIG. 4, the matrix-supported flechette load 12 so produced basically includes the array of flechettes 14, and the solid thermoplastic foam matrix 34 molded directly thereto such that the flechettes 14 are supported in the desired alignments relative to one another with, at the most, only the pointed-tipped leading end portions 14A of the flechettes 14 extending from the leading side of the matrix 34. The finned trailing end portions 14C are completely surrounded by the matrix 34. The matrix-supported load 12 of flechette 14 can thereby be placed as a unit into the shell casing 36 without the loading operation adversely affecting the alignments of the flechettes 14 and without the possibility of contact being made between the fins of the flechettes 14.

It should be understood that, after the matrix-supported flechette load 12 depicted in FIG. 4 has been formed in the molding apparatus 10 and the top end cap 24 removed, an additional molding step could be employed to mold a second matrix 34 directly to the remaining exposed leading end portions 14A of the flechettes 14 should it be desired to completely encapsulate the flechettes 14 in a foam body.

FIG. 5 depicts, by way of example, one embodiment of an assembled shotshell 16 containing the matrix-supported load 12 of flechettes 14 in the desired array seen in FIG. 1. The load 12 is inserted into an outer sleeve or liner 38 before assembly therewith into the shotshell casing 36. Prior to that, a charge of propellant powder 40, an obturating cup 42, a filler wad 44 and a metallic disc 46 are inserted into the casing 36.

FIGS. 6 and 7 illustrate another matrix 34 supporting a load 12 of flechettes 14 in a configuration or array different from that of the flechettes 14 in the load 12 of FIG. 4. The flechettes 14 are all formed in a circular pattern except for one flechette which is placed at the center thereof. Also, as seen in FIG. 7, the center flechette 14 at least at its tip end projects forwardly of the remaining flechettes. This configuration allows the center leading flechette to create a shock wave which will bypass the outer trailing flechettes and thereby help prevent individual flechettes from creating shock waves which would interfer with one another. In some instances, it is advantagous to use a center flechette having a larger diameter or longer length than the outer flechettes.

In one example, the ratio of expandable polystyrene beads to zinc stearate bond weakening agent used in the mixture 32 was in a proportion by weight of ninety-nine percent to one percent. The assembled molding apparatus 10 was placed in boiling water for about twenty minutes. The concentration of the bonding deterrent and the heating time of the mixture influences and controls bonding strength and bead expansion. Bead expansion is also related to the mold cavity volume and the amount (weight) of the mixture used. Controlling these factors is important so that the matrix 34 is weak enough to disintegrate uniformly upon exiting the barrel of the gun firing the shotshell 16. One suitable method is the use of a small amount of bond weakening agent such as zinc stearate as an additive to the mixture to weaken the matrix. Early disintegration of the matrix will eliminate its interaction with the flechette array. In one exemplary test, the matrix disintegrated and released the flechette array about three feet from the barrel muzzle.

Modifications can be made within the scope of the invention. For example, it may be possible to mold a single flechette in a matrix sabot for use in a rifle cartridge and prevent spin due to rifle twist because the matrix particles break free from the flechette and do not transmit rotation, especially if the flechette is unfinned.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

I claim:
1. A fletchette load comprising:
   (a) a load of flechettes; and
   (b) a matrix molded directly to said flechettes such that said flechettes are supported in desired alignments relative to one another with, at the most, only pointed-tipped leading portions of said flechettes extending from said matrix, whereby said matrix-supported load of flechette can be placed as a unit into a shell casing, said matrix being a block-like foam body composed of styrofoam.
2. A fletchette load comprising:
   (a) a load of flechettes; and
   (b) a matrix molded directly to said flechettes such that said flechettes are supported in desired alignments relative to one another with, at the most, only pointed-tipped leading portions of said flechettes extending from said matrix, whereby said matrix-supported load of flechette can be placed as a unit into a shell casing, said matrix being a block-like foam body composed of a heated quantity of expandable thermoplastic beads.
3. The flechette load as recited in claim 2, wherein said foam material further includes a bond weakening agent.
4. The flechette load as recited in claim 3, wherein said bond weakening agent is zinc stearate.
5. The flechette load as recited in claim 2 wherein said expandable beads are polystyrene beads.
6. A fletchette load comprising:
   (a) a load of flechettes; and
   (b) a matrix molded directly to said flechettes such that said flechettes are supported in desired alignments relative to one another with, at the most, only pointed-tipped leading portions of said flechettes extending from said matrix, whereby said matrix-supported load of flechette can be placed as a unit into a shell casing, said matrix being a block-like foam body wherein said matrix includes zinc stearate as a bond weakening agent.
7. A flechette load comprising at least one flechette having a pointed tipped leading portion and a matrix molded directly to said flechette such that said flechette is supported in a desired alignment with, at the most, only said pointed tipped leading portion of said flechette extending from said matrix whereby said matrix supported load of flechette can be placed as a unit into a shell casing.
8. The flechette load as recited in claim 7 further comprising a matrix bond weakening agent for weakening said matrix sufficiently that the matrix shatters during launch of said load.
9. The flechette load as recited in claim 7 further comprising at least one laterally adjacent flechette supported by said matrix.
10. The flechette load as recited in claim 9 wherein said adjacent flechette has a front tip positioned behind said pointed tipped leading portion.
11. The flechette load as recited in claim 7 wherein said flechette has a heavier front portion and a lighter rear portion for stable flight.

* * * * *